US012561266B2

(12) United States Patent　(10) Patent No.:　US 12,561,266 B2
Olarig et al.　(45) Date of Patent:　Feb. 24, 2026

(54) SYSTEM AND METHOD FOR SUPPORTING MULTI-PATH AND/OR MULTI-MODE NMVe OVER FABRICS DEVICES

(71) Applicant: Samsung Electronics Co., Ltd., Suwon-si (KR)

(72) Inventors: Sompong Paul Olarig, Pleasanton, CA (US); Fred Worley, San Jose, CA (US); Son Pham, San Ramon, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/113,618

(22) Filed: Feb. 23, 2023

(65) Prior Publication Data

US 2023/0205720 A1　Jun. 29, 2023

Related U.S. Application Data

(60) Continuation of application No. 17/063,507, filed on Oct. 5, 2020, now Pat. No. 11,860,808, which is a (Continued)

(51) Int. Cl.
*G06F 13/12*　(2006.01)
*G06F 13/16*　(2006.01)
(Continued)

(52) U.S. Cl.
CPC ...... *G06F 13/4022* (2013.01); *G06F 13/1668* (2013.01); *G06F 13/4068* (2013.01);
(Continued)

(58) Field of Classification Search
CPC ............. G06F 13/4022; G06F 13/1668; G06F 13/4068; G06F 13/4282; G06F 2213/0026; G06F 2213/0028; G06F 2213/0036
See application file for complete search history.

(56) References Cited

U.S. PATENT DOCUMENTS 5,299,193 A * 3/1994 Szczepanek ......... H01R 13/665
　　　　　　　　　　　　　　　　370/465
6,167,470 A * 12/2000 Ishii .................... G06F 13/4226
　　　　　　　　　　　　　　　　710/49
(Continued)

FOREIGN PATENT DOCUMENTS

CN　　　1641568　A　7/2005
CN　101847429　B　5/2012
(Continued)

OTHER PUBLICATIONS

US 11,923,992 B2, 03/2024, Olarig et al. (withdrawn)
(Continued)

*Primary Examiner* — Cheng Yuan Tseng
(74) *Attorney, Agent, or Firm* — Renaissance IP Law Group LLP

(57)　ABSTRACT

A system includes a fabric switch including a motherboard, a baseboard management controller (BMC), a network switch configured to transport network signals, and a PCIe switch configured to transport PCIe signals; a midplane; and a plurality of device ports. Each of the plurality of device ports is configured to connect a storage device to the motherboard of the fabric switch over the midplane and carry the network signals and the PCIe signals over the midplane. The storage device is configurable in multiple modes based a protocol established over a fabric connection between the system and the storage device.

19 Claims, 5 Drawing Sheets

Related U.S. Application Data continuation of application No. 16/692,997, filed on Nov. 22, 2019, now Pat. No. 10,795,843, which is a division of application No. 16/211,923, filed on Dec. 6, 2018, now Pat. No. 10,540,311, which is a continuation of application No. 15/403,088, filed on Jan. 10, 2017, now Pat. No. 10,210,123.

(60) Provisional application No. 62/420,355, filed on Nov. 10, 2016, provisional application No. 62/366,622, filed on Jul. 26, 2016.

(51) Int. Cl.
    *G06F 13/40*        (2006.01)
    *G06F 13/42*        (2006.01)

(52) U.S. Cl.
    CPC .. *G06F 13/4282* (2013.01); *G06F 2213/0026* (2013.01); *G06F 2213/0028* (2013.01); *G06F 2213/0036* (2013.01)

(56) References Cited

U.S. PATENT DOCUMENTS

| | | | |
|---|---|---|---|
| 6,295,567 B1 | 9/2001 | Bassman et al. | |
| 6,345,303 B1 | 2/2002 | Knauerhase et al. | |
| 6,427,198 B1 | 7/2002 | Berglund et al. | |
| 6,463,499 B1 * | 10/2002 | Wakeley | G06F 13/4004 |
| | | | 710/11 |
| 6,611,863 B1 | 8/2003 | Banginwar | |
| 6,662,119 B1 | 12/2003 | Mitchell | |
| 6,717,576 B1 | 4/2004 | Duluk, Jr. et al. | |
| 7,031,838 B1 | 4/2006 | Young et al. | |
| 7,107,253 B1 | 9/2006 | Sumner et al. | |
| 7,120,759 B2 | 10/2006 | Chiu et al. | |
| 7,143,153 B1 | 11/2006 | Black et al. | |
| 7,237,036 B2 | 6/2007 | Boucher et al. | |
| 7,249,173 B2 | 7/2007 | Nicolson | |
| 7,409,567 B2 | 8/2008 | Hammes et al. | |
| 7,411,947 B2 * | 8/2008 | Mizuno | H04J 3/0688 |
| | | | 370/401 |
| 7,512,585 B2 | 3/2009 | Agarwal et al. | |
| 7,536,486 B2 | 5/2009 | Sadovsky et al. | |
| 7,620,854 B2 | 11/2009 | Kuttan et al. | |
| 7,788,428 B2 | 8/2010 | Melin | |
| 7,873,700 B2 | 1/2011 | Pawlowski et al. | |
| 7,882,393 B2 | 2/2011 | Grimes et al. | |
| 7,944,812 B2 | 5/2011 | Carlson et al. | |
| 8,065,347 B1 | 11/2011 | DeMeyer et al. | |
| 8,180,862 B2 | 5/2012 | Baker et al. | |
| 8,327,187 B1 | 12/2012 | Metcalf | |
| 8,396,981 B1 | 3/2013 | Lee et al. | |
| 8,599,863 B2 | 12/2013 | Davis | |
| 8,667,224 B1 | 3/2014 | Yu et al. | |
| 8,750,380 B2 * | 6/2014 | Matsubayashi | H04N 21/4122 |
| | | | 348/456 |
| 8,754,681 B2 | 6/2014 | Zhu et al. | |
| 8,832,327 B1 | 9/2014 | Lin | |
| 8,862,791 B2 * | 10/2014 | Tao | H04N 21/43635 |
| | | | 710/16 |
| 8,887,144 B1 | 11/2014 | Marr et al. | |
| 8,943,234 B1 | 1/2015 | Voorhees et al. | |
| 8,949,517 B2 | 2/2015 | Cohen et al. | |
| 8,953,644 B2 | 2/2015 | Chandra et al. | |
| 8,998,636 B2 | 4/2015 | Gomez et al. | |
| 9,037,786 B2 | 5/2015 | Asnaashari et al. | |
| 9,047,222 B2 | 6/2015 | Chandra et al. | |
| 9,092,321 B2 | 7/2015 | Salessi | |
| 9,244,865 B2 | 1/2016 | Hutchison et al. | |
| 9,244,877 B2 | 1/2016 | Yang et al. | |
| 9,253,275 B2 | 2/2016 | Bhogal et al. | |
| 9,280,357 B2 | 3/2016 | Shaver et al. | |
| 9,280,504 B2 | 3/2016 | Ben-Michael et al. | |
| 9,389,805 B2 | 7/2016 | Cohen et al. | |
| 9,400,749 B1 | 7/2016 | Kuzmin et al. | |
| 9,401,879 B1 | 7/2016 | Klemin et al. | |
| 9,430,412 B2 | 8/2016 | Huang | |
| 9,432,298 B1 | 8/2016 | Smith | |
| 9,460,042 B2 | 10/2016 | Iskandar et al. | |
| 9,465,756 B2 | 10/2016 | Bennett | |
| 9,503,309 B2 * | 11/2016 | Chai | H04L 69/322 |
| 9,648,148 B2 | 5/2017 | Rimmer et al. | |
| 9,653,124 B2 | 5/2017 | Heyd et al. | |
| 9,734,093 B2 | 8/2017 | Khemani et al. | |
| 9,734,106 B2 * | 8/2017 | Kotzur | G06F 13/385 |
| 9,785,346 B2 | 10/2017 | Yost | |
| 9,785,355 B2 | 10/2017 | Huang | |
| 9,785,356 B2 | 10/2017 | Huang | |
| 9,798,636 B2 | 10/2017 | Breakstone et al. | |
| 9,811,481 B2 | 11/2017 | Bhatia et al. | |
| 9,830,082 B1 | 11/2017 | Srinivasan et al. | |
| 9,842,084 B2 | 12/2017 | Friedman et al. | |
| 9,904,330 B2 * | 2/2018 | Schuette | G06F 1/185 |
| 9,906,596 B2 | 2/2018 | Sikdar | |
| 9,934,173 B1 | 4/2018 | Sakalley et al. | |
| 9,934,183 B2 | 4/2018 | Brassac et al. | |
| 9,952,634 B2 * | 4/2018 | Samper | G06F 1/16 |
| 9,959,240 B2 | 5/2018 | Mundt | |
| 9,965,367 B2 | 5/2018 | Shih | |
| 9,990,313 B2 | 6/2018 | Monji et al. | |
| 10,013,388 B1 | 7/2018 | Wang | |
| 10,019,388 B2 | 7/2018 | Long et al. | |
| 10,061,852 B1 | 8/2018 | Plenderleith | |
| 10,063,073 B2 | 8/2018 | Yao et al. | |
| 10,063,638 B2 | 8/2018 | Huang | |
| 10,101,764 B2 | 10/2018 | Chou et al. | |
| 10,108,450 B2 | 10/2018 | Pinto et al. | |
| 10,114,778 B2 * | 10/2018 | Worley | G06F 13/4022 |
| 10,140,063 B2 * | 11/2018 | Worley | G06F 3/0661 |
| 10,162,784 B2 | 12/2018 | Bassett et al. | |
| 10,162,793 B1 | 12/2018 | Bshara et al. | |
| 10,180,889 B2 | 1/2019 | Cannata et al. | |
| 10,206,297 B2 | 2/2019 | Breakstone et al. | |
| 10,223,313 B2 | 3/2019 | Shih | |
| 10,223,316 B2 * | 3/2019 | Mataya | G11C 29/44 |
| 10,235,313 B2 | 3/2019 | Lee et al. | |
| 10,255,215 B2 | 4/2019 | Breakstone et al. | |
| 10,257,080 B1 | 4/2019 | Kusam et al. | |
| 10,275,356 B2 | 4/2019 | Chou et al. | |
| 10,289,517 B2 | 5/2019 | Beerens | |
| 10,289,588 B2 * | 5/2019 | Chu | G06F 13/4022 |
| 10,311,003 B2 * | 6/2019 | Pamley | G06F 13/4022 |
| 10,318,443 B2 | 6/2019 | Su | |
| 10,346,041 B2 | 7/2019 | Olarig et al. | |
| 10,372,648 B2 | 8/2019 | Qiu | |
| 10,372,659 B2 | 8/2019 | Olarig et al. | |
| 10,394,723 B2 * | 8/2019 | Yang | G06F 13/28 |
| 10,409,524 B1 | 9/2019 | Branover et al. | |
| 10,409,751 B2 | 9/2019 | Grobelny et al. | |
| 10,452,576 B2 | 10/2019 | Stuhlsatz | |
| 10,467,163 B1 | 11/2019 | Malwankar et al. | |
| 10,467,170 B2 | 11/2019 | McKnight | |
| 10,474,589 B1 | 11/2019 | Raskin | |
| 10,521,378 B2 | 12/2019 | Fischer et al. | |
| 10,560,550 B1 | 2/2020 | Xue et al. | |
| 10,592,144 B2 | 3/2020 | Roberts et al. | |
| 10,733,137 B2 | 8/2020 | Kachare et al. | |
| 10,795,843 B2 | 10/2020 | Olarig et al. | |
| 10,817,443 B2 | 10/2020 | Mao et al. | |
| 10,866,911 B2 | 12/2020 | Qiu et al. | |
| 10,901,927 B2 | 1/2021 | Fischer et al. | |
| 10,909,818 B2 * | 2/2021 | Zhao | G08B 5/36 |
| 10,929,327 B1 * | 2/2021 | Schrempp | G06F 13/4068 |
| 10,942,666 B2 | 3/2021 | Pydipaty et al. | |
| 10,990,553 B2 | 4/2021 | Rust et al. | |
| 11,042,496 B1 | 6/2021 | BeSerra et al. | |
| 11,113,046 B1 | 9/2021 | Bowen et al. | |
| 11,126,352 B2 | 9/2021 | Olarig et al. | |
| 11,126,583 B2 | 9/2021 | Olarig et al. | |
| 11,347,740 B2 | 5/2022 | Moshe et al. | |
| 11,669,481 B2 | 6/2023 | Jen et al. | |
| 11,983,405 B2 | 5/2024 | Olarig et al. | |
| 11,983,406 B2 | 5/2024 | Olarig et al. | |

(56)　　　　　References Cited

U.S. PATENT DOCUMENTS

| | | |
|---|---|---|
| 11,989,413 B2 | 5/2024 | Olarig et al. |
| 2002/0087887 A1 | 7/2002 | Busam et al. |
| 2002/0095491 A1 | 7/2002 | Edmonds et al. |
| 2002/0123365 A1 | 9/2002 | Thorson et al. |
| 2003/0058818 A1 | 3/2003 | Wilkes et al. |
| 2004/0073912 A1 | 4/2004 | Meza |
| 2004/0111590 A1 | 6/2004 | Klein |
| 2004/0147281 A1 | 7/2004 | Holcombe et al. |
| 2004/0153844 A1 | 8/2004 | Ghose et al. |
| 2004/0153851 A1* | 8/2004 | Venugopal .......... G06F 11/2289 |
| | | 714/E11.15 |
| 2004/0255014 A1 | 12/2004 | Motoyama et al. |
| 2005/0025125 A1 | 2/2005 | Kwan |
| 2005/0060442 A1 | 3/2005 | Beverly et al. |
| 2005/0120157 A1 | 6/2005 | Chen et al. |
| 2005/0251609 A1 | 11/2005 | Chou et al. |
| 2006/0059287 A1 | 3/2006 | Rivard et al. |
| 2006/0095625 A1 | 5/2006 | Wootten et al. |
| 2006/0098681 A1 | 5/2006 | Cafiero et al. |
| 2006/0136621 A1 | 6/2006 | Tung et al. |
| 2006/0202950 A1 | 9/2006 | Lee et al. |
| 2007/0077553 A1 | 4/2007 | Bentwich |
| 2008/0003845 A1 | 1/2008 | Hong et al. |
| 2008/0288708 A1 | 11/2008 | Hsueh |
| 2009/0003361 A1* | 1/2009 | Bakthavathsalam ........................ |
| | | G06F 3/0607 |
| | | 370/401 |
| 2009/0073896 A1 | 3/2009 | Gillingham et al. |
| 2009/0077478 A1 | 3/2009 | Gillingham et al. |
| 2009/0217188 A1 | 8/2009 | Alexander et al. |
| 2009/0222733 A1 | 9/2009 | Basham et al. |
| 2009/0259364 A1 | 10/2009 | Vollmer et al. |
| 2010/0077067 A1 | 3/2010 | Strole |
| 2010/0100858 A1 | 4/2010 | Schipper |
| 2010/0106836 A1 | 4/2010 | Schreyer et al. |
| 2010/0169512 A1 | 7/2010 | Matton et al. |
| 2011/0131380 A1 | 6/2011 | Rallens et al. |
| 2011/0151858 A1 | 6/2011 | Lai |
| 2011/0187829 A1 | 8/2011 | Nakajima |
| 2012/0056728 A1 | 3/2012 | Erdmann et al. |
| 2012/0102580 A1 | 4/2012 | Bealkowski |
| 2012/0144136 A1 | 6/2012 | Augenstein et al. |
| 2012/0154375 A1 | 6/2012 | Zhang et al. |
| 2012/0182866 A1 | 7/2012 | Vinayagam et al. |
| 2012/0207156 A1 | 8/2012 | Srinivasan et al. |
| 2012/0311654 A1 | 12/2012 | Dougherty, III et al. |
| 2012/0319750 A1 | 12/2012 | Zhu et al. |
| 2013/0054901 A1 | 2/2013 | Biswas et al. |
| 2013/0073895 A1 | 3/2013 | Cohen |
| 2013/0097352 A1 | 4/2013 | Chu |
| 2013/0117503 A1 | 5/2013 | Nellans et al. |
| 2013/0117601 A1 | 5/2013 | Ackaret et al. |
| 2013/0117766 A1 | 5/2013 | Bax et al. |
| 2013/0179624 A1 | 7/2013 | Lambert et al. |
| 2013/0198311 A1 | 8/2013 | Tamir et al. |
| 2013/0198312 A1 | 8/2013 | Tamir et al. |
| 2013/0242991 A1 | 9/2013 | Basso et al. |
| 2013/0282953 A1 | 10/2013 | Orme et al. |
| 2013/0304979 A1 | 11/2013 | Zimmer et al. |
| 2013/0311795 A1 | 11/2013 | Cong et al. |
| 2013/0318371 A1 | 11/2013 | Hormuth |
| 2013/0325998 A1 | 12/2013 | Hormuth et al. |
| 2014/0032641 A1 | 1/2014 | Du |
| 2014/0040639 A1 | 2/2014 | Raam |
| 2014/0052928 A1 | 2/2014 | Shimoi |
| 2014/0122746 A1 | 5/2014 | Shaver et al. |
| 2014/0195634 A1 | 7/2014 | Kishore et al. |
| 2014/0195711 A1 | 7/2014 | Bhatia et al. |
| 2014/0201394 A1 | 7/2014 | Wagstaff |
| 2014/0208004 A1 | 7/2014 | Cohen et al. |
| 2014/0244888 A1 | 8/2014 | Kallickal |
| 2014/0258679 A1 | 9/2014 | McGee |
| 2014/0281171 A1 | 9/2014 | Canepa |
| 2014/0281458 A1 | 9/2014 | Ravimohan et al. |
| 2014/0317206 A1 | 10/2014 | Lomelino et al. |
| 2014/0330995 A1 | 11/2014 | Levy et al. |
| 2014/0344431 A1 | 11/2014 | Hsu et al. |
| 2014/0344488 A1 | 11/2014 | Flynn et al. |
| 2014/0344492 A1 | 11/2014 | Patwa et al. |
| 2015/0006758 A1 | 1/2015 | Holtman et al. |
| 2015/0039815 A1 | 2/2015 | Klein |
| 2015/0067188 A1 | 3/2015 | Chakhaiyar |
| 2015/0086017 A1 | 3/2015 | Taylor et al. |
| 2015/0091927 A1 | 4/2015 | Cote et al. |
| 2015/0106660 A1 | 4/2015 | Chumbalkar et al. |
| 2015/0120874 A1 | 4/2015 | Kim et al. |
| 2015/0120971 A1 | 4/2015 | Bae et al. |
| 2015/0138900 A1 | 5/2015 | Choi |
| 2015/0143018 A1* | 5/2015 | Kim ................... G06F 13/4022 |
| | | 710/316 |
| 2015/0169231 A1 | 6/2015 | Kanigicherla et al. |
| 2015/0178095 A1 | 6/2015 | Balakrishnan et al. |
| 2015/0181760 A1 | 6/2015 | Stephens |
| 2015/0205541 A1 | 7/2015 | Nishtala et al. |
| 2015/0234815 A1 | 8/2015 | Slik |
| 2015/0254088 A1 | 9/2015 | Chou et al. |
| 2015/0255130 A1 | 9/2015 | Lee et al. |
| 2015/0261434 A1 | 9/2015 | Kagan et al. |
| 2015/0281126 A1 | 10/2015 | Regula et al. |
| 2015/0286599 A1 | 10/2015 | Hershberger |
| 2015/0301757 A1 | 10/2015 | Iwata et al. |
| 2015/0301964 A1 | 10/2015 | Brinicombe et al. |
| 2015/0304423 A1 | 10/2015 | Satoyama et al. |
| 2015/0317176 A1 | 11/2015 | Hussain et al. |
| 2015/0324312 A1 | 11/2015 | Jacobson et al. |
| 2015/0331473 A1 | 11/2015 | Jreji et al. |
| 2015/0350096 A1 | 12/2015 | Dinc et al. |
| 2015/0370661 A1 | 12/2015 | Swanson et al. |
| 2015/0370665 A1 | 12/2015 | Cannata et al. |
| 2015/0376840 A1 | 12/2015 | Shih |
| 2015/0381734 A1 | 12/2015 | Ebihara et al. |
| 2016/0004879 A1 | 1/2016 | Fisher et al. |
| 2016/0062936 A1 | 3/2016 | Brassac et al. |
| 2016/0077841 A1 | 3/2016 | Lambert et al. |
| 2016/0077994 A1 | 3/2016 | Hamada et al. |
| 2016/0085718 A1 | 3/2016 | Huang |
| 2016/0092390 A1 | 3/2016 | Grothen et al. |
| 2016/0094619 A1 | 3/2016 | Khan et al. |
| 2016/0118121 A1 | 4/2016 | Kelly et al. |
| 2016/0127468 A1 | 5/2016 | Malwankar et al. |
| 2016/0127492 A1 | 5/2016 | Malwankar et al. |
| 2016/0146754 A1 | 5/2016 | Prasad et al. |
| 2016/0147446 A1 | 5/2016 | Ghosh |
| 2016/0188313 A1 | 6/2016 | Dubal et al. |
| 2016/0246754 A1 | 8/2016 | Rao et al. |
| 2016/0259597 A1 | 9/2016 | Worley et al. |
| 2016/0261375 A1 | 9/2016 | Roethig et al. |
| 2016/0283428 A1 | 9/2016 | Guddeti |
| 2016/0306723 A1* | 10/2016 | Lu ....................... G06F 11/2094 |
| 2016/0306768 A1 | 10/2016 | Mataya |
| 2016/0328344 A1 | 11/2016 | Jose et al. |
| 2016/0328347 A1 | 11/2016 | Worley et al. |
| 2016/0337272 A1 | 11/2016 | Berman |
| 2016/0342547 A1 | 11/2016 | Liss et al. |
| 2016/0366071 A1 | 12/2016 | Chandran et al. |
| 2016/0378401 A1 | 12/2016 | Savic et al. |
| 2017/0018149 A1 | 1/2017 | Shih |
| 2017/0038804 A1 | 2/2017 | Shows et al. |
| 2017/0046097 A1 | 2/2017 | Jayaraman et al. |
| 2017/0063965 A1 | 3/2017 | Grenader |
| 2017/0068268 A1 | 3/2017 | Giriyappa et al. |
| 2017/0068628 A1 | 3/2017 | Calciu et al. |
| 2017/0068630 A1 | 3/2017 | Iskandar et al. |
| 2017/0102510 A1 | 4/2017 | Faw et al. |
| 2017/0105313 A1 | 4/2017 | Shedd et al. |
| 2017/0168943 A1 | 6/2017 | Chou et al. |
| 2017/0168970 A1 | 6/2017 | Sajeepa et al. |
| 2017/0185554 A1 | 6/2017 | Fricker |
| 2017/0187629 A1 | 6/2017 | Shalev et al. |
| 2017/0206034 A1 | 7/2017 | Fetik |
| 2017/0262029 A1 | 9/2017 | Nelson et al. |
| 2017/0269871 A1 | 9/2017 | Khan et al. |
| 2017/0270001 A1 | 9/2017 | Suryanarayana et al. |
| 2017/0270060 A1 | 9/2017 | Gupta et al. |

(56) References Cited

U.S. PATENT DOCUMENTS

| | | |
|---|---|---|
| 2017/0286305 A1 | 10/2017 | Kalwitz |
| 2017/0315752 A1 | 11/2017 | Colgrove et al. |
| 2017/0317901 A1 | 11/2017 | Agrawal et al. |
| 2017/0344259 A1 | 11/2017 | Freyensee et al. |
| 2017/0344294 A1 | 11/2017 | Mishra et al. |
| 2017/0357299 A1 | 12/2017 | Shabbir et al. |
| 2017/0357515 A1 | 12/2017 | Bower, III et al. |
| 2018/0004685 A1 | 1/2018 | Bhatt et al. |
| 2018/0004695 A1 | 1/2018 | Chu et al. |
| 2018/0019896 A1 | 1/2018 | Paquet et al. |
| 2018/0032462 A1 | 2/2018 | Olarig et al. |
| 2018/0032463 A1 | 2/2018 | Olarig et al. |
| 2018/0032469 A1 | 2/2018 | Olarig et al. |
| 2018/0032471 A1 | 2/2018 | Olarig |
| 2018/0052745 A1 | 2/2018 | Marripudi et al. |
| 2018/0074717 A1 | 3/2018 | Olarig et al. |
| 2018/0074984 A1 | 3/2018 | Olarig et al. |
| 2018/0095904 A1 | 4/2018 | Bunker et al. |
| 2018/0101492 A1 | 4/2018 | Cho et al. |
| 2018/0131633 A1 | 5/2018 | Li |
| 2018/0173652 A1 | 6/2018 | Olarig et al. |
| 2018/0189084 A1 | 7/2018 | Alanis et al. |
| 2018/0210517 A1 | 7/2018 | Yun |
| 2018/0213669 A1 | 7/2018 | Kochukunju |
| 2018/0227369 A1 | 8/2018 | DuCray et al. |
| 2018/0267925 A1 | 9/2018 | Rees |
| 2018/0275919 A1 | 9/2018 | Chirumamilla et al. |
| 2018/0293197 A1 | 10/2018 | Grobelny et al. |
| 2018/0307650 A1 | 10/2018 | Kachare et al. |
| 2018/0335958 A1 | 11/2018 | Wu et al. |
| 2018/0349231 A1 | 12/2018 | Panda et al. |
| 2018/0361237 A1 | 12/2018 | Perlman et al. |
| 2018/0365185 A1 | 12/2018 | Risinger et al. |
| 2018/0373609 A1 | 12/2018 | Beerens |
| 2019/0042424 A1 | 2/2019 | Nair |
| 2019/0087268 A1 | 3/2019 | Koltsidas et al. |
| 2019/0104632 A1 | 4/2019 | Nelson et al. |
| 2019/0140838 A1 | 5/2019 | Bernat et al. |
| 2019/0196745 A1 | 6/2019 | Persson et al. |
| 2019/0205153 A1 | 7/2019 | Niestemski et al. |
| 2019/0286584 A1 | 9/2019 | Olarig et al. |
| 2019/0339888 A1 | 11/2019 | Sasidharan et al. |
| 2020/0021492 A1 | 1/2020 | Ganguli et al. |
| 2020/0042217 A1 | 2/2020 | Roberts et al. |
| 2020/0117663 A1 | 4/2020 | Moshe et al. |
| 2020/0293916 A1 | 9/2020 | Li |
| 2020/0364303 A1 | 11/2020 | Liu et al. |
| 2021/0255979 A1 | 8/2021 | Colenbrander |
| 2021/0342281 A1 | 11/2021 | Olarig et al. |
| 2022/0129383 A1 | 4/2022 | Kim et al. |
| 2022/0151022 A1 | 5/2022 | Chikkur Dattatraya et al. |
| 2022/0188002 A1* | 6/2022 | Olarig .................. G06F 3/0604 |
| 2022/0206693 A1 | 6/2022 | Jung et al. |
| 2022/0303056 A1 | 9/2022 | Miyazaki et al. |
| 2023/0143642 A1 | 5/2023 | Takahashi |
| 2024/0045816 A1 | 2/2024 | Olarig et al. |

FOREIGN PATENT DOCUMENTS

| | | | |
|---|---|---|---|
| CN | 103946824 A | 7/2014 |
| CN | 104025063 A | 9/2014 |
| CN | 104202197 A | 12/2014 |
| CN | 104572516 A | 4/2015 |
| CN | 104615577 A | 5/2015 |
| CN | 105260275 A | 1/2016 |
| CN | 105677595 A | 6/2016 |
| CN | 105912275 A | 8/2016 |
| CN | 103412769 B | 11/2017 |
| CN | 107659518 B | 11/2021 |
| EP | 2290497 A1 | 3/2011 |
| EP | 2843557 A1 | 3/2015 |
| GB | 2308904 A | 7/1997 |
| JP | 2001290752 A | 10/2001 |
| JP | 4257050 B2 | 4/2009 |
| JP | 2010146525 A | 7/2010 |
| JP | 2011048534 A | 3/2011 |
| JP | 2012506184 A | 3/2012 |
| JP | 2013041390 A | 2/2013 |
| JP | 2014241545 A | 12/2014 |
| JP | 2015049742 A | 3/2015 |
| JP | 2015191649 A | 11/2015 |
| JP | 2015194005 A | 11/2015 |
| JP | 2015532985 A | 11/2015 |
| JP | 2016037501 A | 3/2016 |
| JP | 2016045968 A | 4/2016 |
| JP | WO2015194005 A1 | 4/2017 |
| KR | 20050001307 A | 1/2005 |
| KR | 20090106469 A | 10/2009 |
| KR | 20120135205 A | 12/2012 |
| KR | 20150047785 A | 5/2015 |
| KR | 20150071898 A | 6/2015 |
| KR | 20160074659 A | 6/2016 |
| KR | 20180012191 A | 2/2018 |
| KR | 20180012201 A | 2/2018 |
| TW | 201445325 A | 12/2014 |
| WO | 2011144075 A3 | 11/2011 |
| WO | 2013077867 A1 | 5/2013 |
| WO | 2014209764 A1 | 12/2014 |
| WO | 2015049742 A1 | 4/2015 |
| WO | 2015191649 A1 | 12/2015 |
| WO | 2016037501 A1 | 3/2016 |
| WO | 2016085016 A1 | 6/2016 |

OTHER PUBLICATIONS

Corrected Notice of Allowability for U.S. Appl. No. 17/063,501, mailed Jun. 23, 2022.
Corrected Notice of Allowability for U.S. Appl. No. 17/063,501, mailed Nov. 21, 2022.
Corrected Notice of Allowability for U.S. Appl. No. 17/063,501, mailed Oct. 13, 2022.
Corrected Notice of Allowability for U.S. Appl. No. 17/063,507, mailed Aug. 16, 2023.
Corrected Notice of Allowability for U.S. Appl. No. 17/063,507, mailed Jan. 17, 2023.
Corrected Notice of Allowability for U.S. Appl. No. 17/063,507, mailed Jun. 1, 2023.
Corrected Notice of Allowability for U.S. Appl. No. 17/063,507, mailed Jun. 20, 2023.
Corrected Notice of Allowability for U.S. Appl. No. 17/063,507, mailed Mar. 1, 2023.
Corrected Notice of Allowability for U.S. Appl. No. 17/063,507, mailed Nov. 13, 2023.
Corrected Notice of Allowability for U.S. Appl. No. 17/063,507, mailed Nov. 30, 2022.
Corrected Notice of Allowability for U.S. Appl. No. 17/063,507, mailed Sep. 27, 2023.
Corrected Notice of Allowability for U.S. Appl. No. 17/099,776, mailed Aug. 24, 2022.
Corrected Notice of Allowability for U.S. Appl. No. 17/099,776, mailed Feb. 26, 2024.
Corrected Notice of Allowability for U.S. Appl. No. 17/099,776, mailed Jan. 9, 2024.
Corrected Notice of Allowability for U.S. Appl. No. 17/099,776, mailed Jul. 21, 2022.
Corrected Notice of Allowability for U.S. Appl. No. 17/099,776, mailed Jun. 20, 2022.
Corrected Notice of Allowability for U.S. Appl. No. 17/099,776, mailed Nov. 30, 2022.
Corrected Notice of Allowability for U.S. Appl. No. 17/099,776, mailed Oct. 19, 2022.
Corrected Notice of Allowability for U.S. Appl. No. 17/376,145, mailed Aug. 28, 2023.
Corrected Notice of Allowability for U.S. Appl. No. 17/376,145, mailed Dec. 8, 2023.
Corrected Notice of Allowability for U.S. Appl. No. 17/376,145, mailed Jan. 18, 2024.
Corrected Notice of Allowability for U.S. Appl. No. 17/376,145, mailed Jan. 4, 2024.

(56) References Cited

OTHER PUBLICATIONS

Corrected Notice of Allowability for U.S. Appl. No. 17/376,145, mailed Mar. 13, 2024.

Corrected Notice of Allowability for U.S. Appl. No. 17/376,145, mailed Oct. 12, 2023.

Corrected Notice of Allowability for U.S. Appl. No. 17/408,365, mailed Feb. 26, 2024.

Corrected Notice of Allowability for U.S. Appl. No. 17/408,365, mailed Jan. 31, 2024.

Corrected Notice of Allowability for U.S. Appl. No. 17/868,734, mailed Feb. 1, 2024.

Corrected Notice of Allowability for U.S. Appl. No. 17/868,734, mailed Feb. 26, 2024.

Corrected Notice of Allowability for U.S. Appl. No. 17/868,734, mailed Nov. 27, 2023.

Fang, Chin, "Using NVMe Gen3 PCle SSD Cards in High-density Servers for High-performance Big Data Transfer Over Multiple Network Channels", SLAC National Accelerator Laboratory, Stanford University, Stanford, California, Feb. 7, 2015, 17 pages.

Final Office Action for U.S. Appl. No. 15/256,495, mailed Dec. 4, 2019.

Final Office Action for U.S. Appl. No. 15/256,495, mailed Oct. 19, 2018.

Final Office Action for U.S. Appl. No. 15/345,509, mailed Feb. 21, 2019.

Final Office Action for U.S. Appl. No. 15/411,962, mailed Dec. 20, 2018.

Final Office Action for U.S. Appl. No. 16/202,079, mailed Feb. 15, 2024.

Final Office Action for U.S. Appl. No. 16/211,923, mailed Aug. 19, 2019.

Final Office Action for U.S. Appl. No. 16/424,474, mailed May 1, 2020.

Final Office Action for U.S. Appl. No. 16/692,997, mailed Mar. 26, 2020.

Final Office Action for U.S. Appl. No. 16/844,995, mailed Mar. 29, 2021.

Final Office Action for U.S. Appl. No. 17/022,075, mailed May 25, 2022.

Final Office Action for U.S. Appl. No. 17/063,501, mailed Nov. 2, 2021.

Final Office Action for U.S. Appl. No. 17/063,507, mailed Jun. 27, 2022.

Final Office Action for U.S. Appl. No. 17/063,507, mailed Nov. 22, 2021.

Final Office Action for U.S. Appl. No. 17/230,989, mailed Jun. 28, 2023.

Final Office Action for U.S. Appl. No. 17/230,989, mailed Mar. 5, 2024.

Final Office Action for U.S. Appl. No. 17/230,989, mailed Sep. 26, 2023.

Final Office Action for U.S. Appl. No. 17/408,365, mailed Apr. 18, 2023.

Final Office Action for U.S. Appl. No. 17/408,365, mailed Dec. 27, 2022.

Final Office Action for U.S. Appl. No. 18/106,477, mailed Jul. 25, 2024.

Notice of Allowance for U.S. Appl. No. 15/256,495, mailed Mar. 5, 2020.

Notice of Allowance for U.S. Appl. No. 15/345,507, mailed Feb. 19, 2019.

Notice of Allowance for U.S. Appl. No. 15/345,509, mailed Feb. 8, 2022.

Notice of Allowance for U.S. Appl. No. 15/345,509, mailed May 13, 2021.

Notice of Allowance for U.S. Appl. No. 15/403,088, mailed Oct. 22, 2018.

Notice of Allowance for U.S. Appl. No. 15/411,962, mailed Mar. 18, 2019.

Notice of Allowance for U.S. Appl. No. 16/202,079, mailed Jan. 27, 2021.

Notice of Allowance for U.S. Appl. No. 16/202,079, mailed Jun. 1, 2020.

Notice of Allowance for U.S. Appl. No. 16/202,079, mailed Mar. 17, 2022.

Notice of Allowance for U.S. Appl. No. 16/202,079, mailed May 14, 2021.

Notice of Allowance for U.S. Appl. No. 16/211,923, mailed Sep. 13, 2019.

Notice of Allowance for U.S. Appl. No. 16/421,458, mailed Apr. 15, 2020.

Notice of Allowance for U.S. Appl. No. 16/424,474, mailed Apr. 30, 2021.

Notice of Allowance for U.S. Appl. No. 16/424,474, mailed Jul. 15, 2020.

Notice of Allowance for U.S. Appl. No. 16/692,997, mailed Jun. 1, 2020.

Notice of Allowance for U.S. Appl. No. 16/844,995, mailed Aug. 26, 2022.

Notice of Allowance for U.S. Appl. No. 16/844,995, mailed Sep. 29, 2021.

Notice of Allowance for U.S. Appl. No. 16/857,172, mailed May 3, 2021.

Notice of Allowance for U.S. Appl. No. 16/921,923, mailed Feb. 18, 2021.

Notice of Allowance for U.S. Appl. No. 16/950,624, mailed May 10, 2021.

Notice of Allowance for U.S. Appl. No. 17/022,075, mailed Aug. 23, 2022.

Notice of Allowance for U.S. Appl. No. 17/022,075, mailed Nov. 29, 2023.

Notice of Allowance for U.S. Appl. No. 17/063,501, mailed Jun. 2, 2022.

Notice of Allowance for U.S. Appl. No. 17/063,507, mailed Oct. 7, 2022.

Notice of Allowance for U.S. Appl. No. 17/099,776, mailed Aug. 8, 2023.

Notice of Allowance for U.S. Appl. No. 17/099,776, mailed Feb. 15, 2022.

Notice of Allowance for U.S. Appl. No. 17/376,145, mailed Jun. 20, 2023.

Notice of Allowance for U.S. Appl. No. 17/408,365, mailed Sep. 19, 2023.

Notice of Allowance for U.S. Appl. No. 17/868,734, mailed Jul. 6, 2023.

NVM Express over Fabrics specification Revision 1.0; NVM Express Inc.; Jun. 5, 2016. (Year: 2016).

OC3D, "What is the New U.2 SSD Connection?" OC3D News, Jul. 2016, (https://www.overclock3d.net/news/storage/what_is_the_new_u_2_ssd_connection/1), retrieved May 2018, 4 pages.

OC3D, "What is the New U.2 SSD Connection?," (https://www.overclock3d.net/news/storage/what_is_the_new_u_2_ssd_connection/1), Jul. 2016, retrieved Apr. 12, 2021, 5 pages.

Office Action for U.S. Appl. No. 15/256,495, mailed Jun. 14, 2019.

Office Action for U.S. Appl. No. 15/256,495, mailed Mar. 29, 2018.

Office Action for U.S. Appl. No. 15/345,507, mailed Dec. 3, 2018.

Office Action for U.S. Appl. No. 15/345,509, mailed Apr. 29, 2020.

Office Action for U.S. Appl. No. 15/345,509, mailed Nov. 29, 2019.

Office Action for U.S. Appl. No. 15/345,509, mailed Sep. 10, 2018.

Office Action for U.S. Appl. No. 15/345,509, mailed Sep. 28, 2020.

Office Action for U.S. Appl. No. 15/403,088, mailed Jun. 7, 2018.

Office Action for U.S. Appl. No. 15/411,962, mailed Aug. 10, 2018.

Office Action for U.S. Appl. No. 16/202,079, mailed Aug. 22, 2019.

Office Action for U.S. Appl. No. 16/202,079, mailed Dec. 9, 2021.

Office Action for U.S. Appl. No. 16/202,079, mailed Feb. 2, 2023.

Office Action for U.S. Appl. No. 16/202,079, mailed Mar. 4, 2020.

Office Action for U.S. Appl. No. 16/211,923, mailed May 6, 2019.

Office Action for U.S. Appl. No. 16/421,458, mailed Dec. 30, 2019.

Office Action for U.S. Appl. No. 16/424,474, mailed Feb. 3, 2020.

Office Action for U.S. Appl. No. 16/424,474, mailed Oct. 15, 2019.

Office Action for U.S. Appl. No. 16/692,997, mailed Dec. 19, 2019.

Office Action for U.S. Appl. No. 16/844,995, mailed Feb. 22, 2022.

(56)         References Cited

OTHER PUBLICATIONS

Office Action for U.S. Appl. No. 16/844,995, mailed Sep. 4, 2020.
Office Action for U.S. Appl. No. 16/857,172, mailed Oct. 8, 2020.
Office Action for U.S. Appl. No. 16/921,923, mailed Oct. 28, 2020.
Office Action for U.S. Appl. No. 16/950,624, mailed Jan. 25, 2021.
Office Action for U.S. Appl. No. 17/022,075, mailed May 11, 2023.
Office Action for U.S. Appl. No. 17/022,075, mailed Oct. 15, 2021.
Office Action for U.S. Appl. No. 17/063,501, mailed Feb. 24, 2022.
Office Action for U.S. Appl. No. 17/063,501, mailed Jul. 15, 2021.
Office Action for U.S. Appl. No. 17/063,507, mailed Aug. 6, 2021.
Office Action for U.S. Appl. No. 17/063,507, mailed Mar. 17, 2022.
Office Action for U.S. Appl. No. 17/099,776, mailed Apr. 17, 2023.
Office Action for U.S. Appl. No. 17/099,776, mailed Sep. 24, 2021.
Office Action for U.S. Appl. No. 17/230,989, mailed Oct. 31, 2022.
Office Action for U.S. Appl. No. 17/376,145, mailed Sep. 30, 2022.
Office Action for U.S. Appl. No. 17/408,365, mailed Aug. 2, 2022.
Office Action for U.S. Appl. No. 17/868,734, mailed Feb. 14, 2023.
Office Action for U.S. Appl. No. 18/074,445, mailed Jul. 29, 2024.
Office Action for U.S. Appl. No. 18/106,477, mailed Jan. 11, 2024.
Office Action for U.S. Appl. No. 18/206,079, mailed Jun. 20, 2024.
SSD Form Factor Work Group, "Enterprise SSD Form Factor 1.0a", 2012, SSD Form Factor Work Group, pp. 1-55. (Year: 2012).
Supplemental Notice of Allowability for U.S. Appl. No. 17/099,776, mailed Aug. 17, 2023.
Supplemental Notice of Allowability for U.S. Appl. No. 17/099,776, mailed May 16, 2022.
Supplemental Notice of Allowability for U.S. Appl. No. 17/099,776, mailed Nov. 16, 2023.
Supplemental Notice of Allowability for U.S. Appl. No. 17/099,776, mailed Sep. 27, 2023.
Supplemental Notice of Allowability for U.S. Appl. No. 17/408,365, mailed Jan. 3, 2024.
Supplemental Notice of Allowability for U.S. Appl. No. 17/408,365, mailed Nov. 24, 2023.
Supplemental Notice of Allowability for U.S. Appl. No. 17/408,365, mailed Sep. 28, 2023.
Supplemental Notice of Allowability for U.S. Appl. No. 17/868,734, mailed Aug. 14, 2023.
Supplemental Notice of Allowability for U.S. Appl. No. 17/868,734, mailed Sep. 25, 2023.
Wikipedia, "SATA Express", (https://en.wikipedia.org/wiki/SATA_Express), retrieved May 2018, 6 pages.
Wikipedia, "SATA Express," (https://en.wikipedia.org/wiki/SATA_Express), retrieved Apr. 12, 2021, 6 pages.
Wikipedia, "U.2", (https://en.wikipedia.org/wiki/U.2), retrieved May 2018, 3 pages.
Wikipedia, "U.2," (https://en.wikipedia.org/wiki/U.2), retrieved Apr. 12, 2021, 2 pages.
Advisory Action for U.S. Appl. No. 15/256,495, mailed Feb. 1, 2019.
Corrected Notice of Allowability for U.S. Appl. No. 15/256,495, mailed Mar. 18, 2021.
Corrected Notice of Allowability for U.S. Appl. No. 15/256,495, mailed May 13, 2021.
Corrected Notice of Allowability for U.S. Appl. No. 15/345,509, mailed Aug. 11, 2021.
Corrected Notice of Allowability for U.S. Appl. No. 15/345,509, mailed Aug. 30, 2021.
Corrected Notice of Allowability for U.S. Appl. No. 15/345,509, mailed Aug. 8, 2022.
Corrected Notice of Allowability for U.S. Appl. No. 15/345,509, mailed Dec. 10, 2021.
Corrected Notice of Allowability for U.S. Appl. No. 15/345,509, mailed Jun. 10, 2022.
Corrected Notice of Allowability for U.S. Appl. No. 15/345,509, mailed Jun. 15, 2021.
Corrected Notice of Allowability for U.S. Appl. No. 15/345,509, mailed Jun. 27, 2022.
Corrected Notice of Allowability for U.S. Appl. No. 15/345,509, mailed Oct. 27, 2021.
Corrected Notice of Allowability for U.S. Appl. No. 15/345,509, mailed Sep. 7, 2022.
Corrected Notice of Allowability for U.S. Appl. No. 16/202,079, mailed Aug. 17, 2022.
Corrected Notice of Allowability for U.S. Appl. No. 16/202,079, mailed Aug. 31, 2022.
Corrected Notice of Allowability for U.S. Appl. No. 16/202,079, mailed Jul. 12, 2021.
Corrected Notice of Allowability for U.S. Appl. No. 16/202,079, mailed Jul. 22, 2020.
Corrected Notice of Allowability for U.S. Appl. No. 16/202,079, mailed Jul. 7, 2022.
Corrected Notice of Allowability for U.S. Appl. No. 16/202,079, mailed Sep. 15, 2021.
Corrected Notice of Allowability for U.S. Appl. No. 16/424,474, mailed Aug. 18, 2021.
Corrected Notice of Allowability for U.S. Appl. No. 16/424,474, mailed Feb. 22, 2021.
Corrected Notice of Allowability for U.S. Appl. No. 16/424,474, mailed Mar. 29, 2021.
Corrected Notice of Allowability for U.S. Appl. No. 16/692,997, mailed Jun. 18, 2020.
Corrected Notice of Allowability for U.S. Appl. No. 16/844,995, mailed Dec. 9, 2021.
Corrected Notice of Allowability for U.S. Appl. No. 16/844,995, mailed Feb. 12, 2024.
Corrected Notice of Allowability for U.S. Appl. No. 16/844,995, mailed Jan. 19, 2023.
Corrected Notice of Allowability for U.S. Appl. No. 16/844,995, mailed Jun. 30, 2023.
Corrected Notice of Allowability for U.S. Appl. No. 16/844,995, mailed Jun. 7, 2023.
Corrected Notice of Allowability for U.S. Appl. No. 16/844,995, mailed Mar. 15, 2023.
Corrected Notice of Allowability for U.S. Appl. No. 16/844,995, mailed Mar. 22, 2023.
Corrected Notice of Allowability for U.S. Appl. No. 16/844,995, mailed Mar. 6, 2024.
Corrected Notice of Allowability for U.S. Appl. No. 16/844,995, mailed May 5, 2023.
Corrected Notice of Allowability for U.S. Appl. No. 16/844,995, mailed Nov. 27, 2023.
Corrected Notice of Allowability for U.S. Appl. No. 16/844,995, mailed Oct. 12, 2023.
Corrected Notice of Allowability for U.S. Appl. No. 16/844,995, mailed Oct. 20, 2022.
Corrected Notice of Allowability for U.S. Appl. No. 16/844,995, mailed Sep. 5, 2023.
Corrected Notice of Allowability for U.S. Appl. No. 16/857,172, mailed Aug. 20, 2021.
Corrected Notice of Allowability for U.S. Appl. No. 16/921,923, mailed Apr. 1, 2021.
Corrected Notice of Allowability for U.S. Appl. No. 16/921,923, mailed Aug. 24, 2021.
Corrected Notice of Allowability for U.S. Appl. No. 16/921,923, mailed Jul. 14, 2021.
Corrected Notice of Allowability for U.S. Appl. No. 16/921,923, mailed May 26, 2021.
Corrected Notice of Allowability for U.S. Appl. No. 16/950,624, mailed Jul. 16, 2021.
Corrected Notice of Allowability for U.S. Appl. No. 16/950,624, mailed Jun. 10, 2021.
Corrected Notice of Allowability for U.S. Appl. No. 17/022,075, mailed Dec. 5, 2022.
Corrected Notice of Allowability for U.S. Appl. No. 17/022,075, mailed Jan. 2, 2024.
Corrected Notice of Allowability for U.S. Appl. No. 17/022,075, mailed Jan. 22, 2024.
Corrected Notice of Allowability for U.S. Appl. No. 17/022,075, mailed Mar. 15, 2024.
Corrected Notice of Allowability for U.S. Appl. No. 17/022,075, mailed Sep. 6, 2022.

(56) References Cited

OTHER PUBLICATIONS

Corrected Notice of Allowability for U.S. Appl. No. 17/063,501, mailed Aug. 24, 2022.
Corrected Notice of Allowability for U.S. Appl. No. 17/063,501, mailed Jul. 27, 2022.
Corrected Notice of Allowability for U.S. Appl. No. 17/063,501, mailed Jul. 7, 2022.
Notice of Allowance for U.S. Appl. No. 16/202,079, mailed Sep. 24, 2024.
Office Action for U.S. Appl. No. 18/437,234, mailed Sep. 12, 2024.
Final Office Action for U.S. Appl. No. 18/074,445, mailed Feb. 13, 2025.
NVM Express, "Moves Into the Future," publisher nvmexpress.org, Jun. 2016, 7 pages.
Office Action for U.S. Appl. No. 17/230,989, mailed Aug. 29, 2024.
Final Office Action for U.S. Appl. No. 18/206,079, mailed Dec. 20, 2024.
Office Action for U.S. Appl. No. 17/022,075, mailed Nov. 26, 2024.
Office Action for U.S. Appl. No. 18/106,477, mailed Nov. 8, 2024.
Office Action for U.S. Appl. No. 18/437,234, mailed Jan. 6, 2025.
Final Office Action for U.S. Appl. No. 17/022,075, mailed Jul. 8, 2025.
Final Office Action for U.S. Appl. No. 17/022,075, mailed Jun. 4, 2025.
Final Office Action for U.S. Appl. No. 17/230,989, mailed Apr. 25, 2025.
Final Office Action for U.S. Appl. No. 18/074,445, mailed May 16, 2025.
Notice of Allowance for U.S. Appl. No. 18/106,477, mailed Jun. 3, 2025.
Notice of Allowance for U.S. Appl. No. 18/437,234, mailed May 7, 2025.
Office Action for U.S. Appl. No. 18/206,079, mailed Jun. 18, 2025.
Office Action for U.S. Appl. No. 18/381,614, mailed Jun. 4, 2025.
Notice of Allowance for U.S. Appl. No. 18/206,079, mailed Sep. 23, 2025.
Office Action for U.S. Appl. No. 18/074,445, mailed Sep. 15, 2025.
Final Office Action for U.S. Appl. No. 18/381,614, mailed Nov. 18, 2025.
Office Action for U.S. Appl. No. 17/230,989, mailed Nov. 21, 2025.
Notice of Allowance for U.S. Appl. No. 15/256,495, mailed Oct. 15, 2025.
Office Action for U.S. Appl. No. 17/022,075, mailed Oct. 28, 2025.
Office Action for U.S. Appl. No. 18/437,234, mailed Oct. 17, 2025.

* cited by examiner

SYSTEM AND METHOD FOR SUPPORTING MULTI-PATH AND/OR MULTI-MODE NMVe OVER FABRICS DEVICES

CROSS-REFERENCE TO RELATED APPLICATION(S)

This application is a continuation of U.S. patent application Ser. No. 17/063,507 filed Oct. 5, 2020, which is a continuation of U.S. patent application Ser. No. 16/692,997 filed Nov. 22, 2019, now issued as U.S. Pat. No. 10,795,843, which is a divisional application of U.S. patent application Ser. No. 16/211,923 filed Dec. 6, 2018, now issued as U.S. Pat. No. 10,540,311, which is a continuation application of U.S. patent application Ser. No. 15/403,088 filed Jan. 10, 2017, now issued as U.S. Pat. No. 10,210,123, which claims the benefits of and priority to U.S. Provisional Patent Application Ser. Nos. 62/366,622 filed Jul. 26, 2016 and entitled "SELF-CONFIGURING SSD MULTI-PROTO-COL SUPPORT IN HOST-LESS ENVIRONMENT," and 62/420,355 filed Nov. 10, 2016 and entitled "MODULAR SYSTEM ARCHITECTURE FOR SUPPORTING MULTI-PATH AND/OR MULTI-MODE NMVE OVER FABRICS DEVICES," and the disclosures of which are incorporated herein by reference in their entirety.

TECHNICAL FIELD

The present disclosure relates generally to network-at-tached devices, more particularly, to a system and method for supporting multi-path and/or multi-mode NVMe over fabrics (NVMeoF) devices.

BACKGROUND

Non-volatile memory express (NVMe) and NVMe over fabrics (NVMeoF) (or NVMf in short) are new emerging technologies. NVMe is a standard that defines a register-level interface for host software to communicate with a non-volatile memory subsystem (e.g., a solid-state drive (SSD)) over a peripheral component interconnect express (PCIe) bus.

NVMeoF defines a common architecture that supports an NVMe block storage protocol over a wide range of storage networking fabrics such as Ethernet, Fibre Channel, Infini-Band, and other network fabrics. For an NVMeoF-based system, an X86-based central processing unit (CPU) on a motherboard is no longer required to move data between an initiator (e.g., host software) and a target device (i.e., an NVMeoF device) because the target device is capable of moving data by itself. The term, fabric, represents a network topology in which network nodes can pass data to each other through a variety of interconnecting protocols, ports, and switches. For example, Ethernet-attached SSDs may attach directly to a fabric, and in this case the fabric is the Ethernet.

The physical connection of the NVMe is based on a PCIe bus. A typical Ethernet SSD has a U.2 connector to interface with a system via a mid-plane over the PCIe bus. In the case of the four-lane PCIe bus (PCIe×4), the two Ethernet ports consume only two lanes of the four-lane PCIe signals, and the remaining two lanes of the PCIe×4 signals remain unused.

SUMMARY

According to one embodiment, a system includes a fabric switch including a motherboard, a baseboard management controller (BMC), a network switch configured to transport network signals, and a PCIe switch configured to transport PCIe signals; a midplane; and a plurality of device ports. Each of the plurality of device ports is configured to connect a storage device to the motherboard of the fabric switch over the midplane and carry the network signals and the PCIe signals over the midplane. The storage device is configur-able in multiple modes based on a protocol established over a fabric connection between the system and the storage device.

According to another embodiment, an NVMeoF includes: a PCIe module; a network engine; and a connector config-ured to connect to a switch motherboard over a midplane and carry PCIe signals over the midplane. The PCIe module transports PCIe signals to the switch over the PCIe bus, and the network engine transport network signals to the switch over Serial Attached SCSI (SAS) pins of the connector.

According to yet another embodiment, a system includes: a switch and a plurality of NVMeoF devices. Each NVMeoF device is configured to be coupled to the switch using a connector. The connector is configured to transport the PCIe signals to the switch over a PCIe bus and transport network signals to the switch over a network bus.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodi-ment given below serve to explain and teach the principles described herein.

Figure 1:
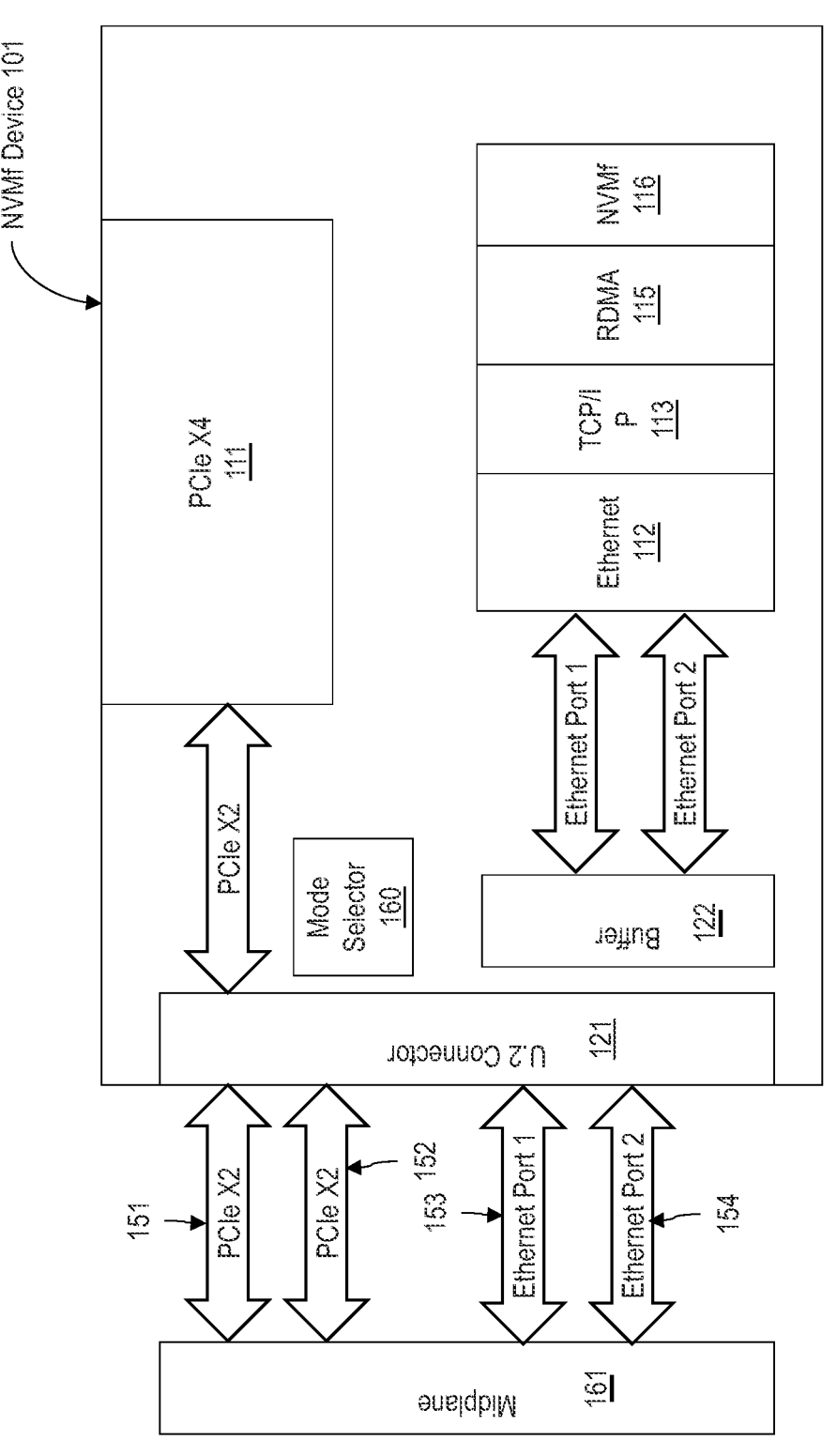
FIG. 1 illustrates a block diagram of an example NVMeoF device, according to one embodiment.

The figures are not necessarily drawn to scale and ele-ments of similar structures or functions are generally rep-resented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for supporting multi-path and/or multi-mode NVMeoF devices. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a system that can support both the NVMe and NVMeoF protocols, and various types of fabric-attached SSDs (eSSDs). In some embodiments, an eSSD refers to an SSD that can support the NVMeoF protocols. When configured to support the NVMeoF standard, the system can support various fabrics including not only Ethernet, but also, Fibre Channel, InfiniBand, and other network fabrics. For the convenience of illustration, the following examples and embodiments can show an Ethernet-attached NVMeoF devices. However, it is noted that any other type of NVMeoF devices can be used without deviating from the scope of the present disclosure.

The present system provides a single platform and common building blocks that can support both single and dual pathing systems compatible with both NVMe and NVMeoF devices. According to one embodiment, the common building blocks that support single pathing and dual pathing NVMe and NVMeoF devices include a mid-plane, a chassis, a fan assembly. The present system can scale linearly by adding more similar devices and/or chassis. The present system may also include other building blocks including, but not limited to, a full-width and a half-width switch boards, and an X86 motherboard.

The fabric-attached SSD (eSSD) disclosed herein is a single common device that can be used in multiples systems compatible with NVMe and NVMeoF standards. In this sense, the fabric-attached SSD is also referred to as a multi-mode NVMeoF device. The present system provides a platform that can supporting various types of NVMe and NVMeoF devices in non-high availability (non-HA) mode (i.e., single-path input/output (I/O/)) or HA mode (i.e., multi-path I/O) with minimum hardware changes.

According to one embodiment, the multi-mode NVMeoF device can support either NVMe or NVMeoF standard by detecting product information from a known location. For example, the product information used for self-configuration is stored in the chassis is a vital product data (VPD). During the start-up, the multi-mode NVMeoF device can retrieve the VPD from the chassis and configure itself based on the VPD. However, it is noted that the multi-mode NVMeoF device can be configured in various manners without deviating from the scope of the present disclosure. For example, the multi-mode NVMeoF device can be configured by a control command over the PCIe bus issued by a BMC of the switch to which the multi-mode NVMeoF device is connected.

According to one embodiment, the multi-mode NVMeoF device can be configured in a single port NVMe mode, a dual port NVMe mode, a single port NVMeoF mode, and a dual port NVMeoF mode. Table 1 shows example use of the U.2 connector according to the configuration of the multi-mode NVMeoF device. When configured as an NVMe device, the multi-mode NVMeoF device can be configured in either the single port NVMe mode or the dual port NVMe mode. In the single port NVMe mode, the PCIe lanes 0-3 of the U.2 connector are used to carry PCIe signals. In the dual port NVMe mode, the PCIe lanes are split into 2 by 2 lanes; the PCIe lanes 0 and 1 are used for the first port, and the PCIe lanes 2 and 3 are used for the second port. When configured as an NVMeoF device, the multi-mode NVMeoF device can be configured in either the single port NVMeoF mode or the dual port NVMeoF mode. In the single port NVMeoF mode, the PCIe lanes are split into 2 by 2 lanes but only the PCIe lanes 0 and 1 are used to carry PCIe signals, and the PCIe lanes 2 and 3 are not used. The first pair of the SAS port 0 is used for the Ethernet port 0 (first port), and the SAS port 1 is not used. In the dual port NVMeoF mode, the PCIe lanes are split into 2 by 2 lanes, and the PCIe lanes 0 and 1 are used as a control plane for the first Ethernet port, and the PCIe lanes 2 and 3 are used as a control plane for the second Ethernet port. The first pair of the SAS port 0 is used for the Ethernet port 0 (first port), and the SAS port 1 is used for the Ethernet port 1 (second port).

6 and the NVMeoF mode. For the similar reason, the multi-mode NVMeoF device can have a faster time to the market. The multi-mode NVMeoF device can be used in various products and chassis. The two lanes of the PCIe bus are reserved for standard features through a control plane. A CPU, a baseboard management controller (BMC), and other devices can use the two lanes of the PCIe bus as a control plane to communicate to each NVMeoF device inside the chassis at no additional cost. The NVMe mid-plane can be used as unmodified, and there is no need for a new connector on the NVMeoF device due to the additional new pins.

FIG. 1 illustrates a block diagram of an example NVMeoF device, according to one embodiment. The NVMeoF device

TABLE 1

| | | Example use of U.2 connector | | |
|---|---|---|---|---|
| Configuration | PCIe lanes 0&1 of U.2 connector | PCIe lanes 2&3 of U.2 connector | PCIe lanes 0-3 of U.2 connector | SAS Port 0 and 1 of U.2 connector |
| Single port NVMe | | | Yes | Not used |
| Dual port NVMe | Yes - used as first port | Yes - used as second port | Split into 2 by 2 lanes | Not used |
| Single port NVMeoF | Yes - used as control plane for first Ethernet port | Not used | Split into 2 by 2 lanes | First pair of SAS port 0 used for Ethernet port 0 (first port) SAS port 1 is not used |
| Dual port NVMeoF | Yes - used as control plane for first Ethernet port | Yes - used as control plane for second Ethernet port | Split into 2 by 2 lanes | First pair of SAS port 0 used for Ethernet port 0 (first port) Second pair of SAS port 1 used for Ethernet port 1 (second port) |

If the product information is stored in a chassis, the two lanes (in a single port mode) or four lanes (in a dual port mode) of the PCIe bus on the U.2 connector are driven by a PCIe engine. In this case, the multi-mode NVMeoF device can disable the Ethernet engine(s), and the NVMe protocols and functionalities are supported or enabled. If the product information is stored in an NVMeoF chassis, the Ethernet ports use only PCIe lanes 2 and 3, or Serial Attached SCSI (SAS) pins depending on the design of the multi-mode NVMeoF device.

The present multi-mode NVMeoF device can operate in two distinct modes, namely, an NVMe mode and an NVMeoF mode. In the NVMe mode, the multi-mode NVMeoF device behaves as an NVMe device. The PCIe pins of the U.2 connector can be connected to the PCIe×4 module 111. The PCIe bus can be shared by data and control.

In one embodiment, in the NVMeoF mode, the multi-mode NVMeoF device can be configured in a single-path mode or a dual-path mode. In the single path mode, one PCIe×2 is used for control plane and is connected to one motherboard. In the dual-path mode, two PCIe×2 are used for control plane and are connected to two motherboards.

In another embodiment, the NVMeoF device can use SAS pins for the Ethernet ports in the NVMeoF mode. In the non-HA NVMeoF mode, the two lanes of the PCIe bus are used for standard features through a control plane. In the dual-port HA mode, the four lanes of the PCIe bus are split into two X2 lanes and used for port A and port B, respectively. The existing PCIe software and driver may be used as unmodified for the multi-mode NVMeoF device.

Because the multi-mode NVMeoF device can operate both in the NVMe and NVMeoF modes, the cost for developing and deploying the devices can be reduced because the same devices can be used in the NVMe mode 101 includes a PCIe×4 module 111 (e.g., PCIe×4 Gen3 module) and various hardware and protocol stacks including, but not limited to, an Ethernet network interface card (NIC) 112, and a TCP/IP offload engine 113, an RDMA controller 115, an NVMeoF protocol stack 116. The NVMeoF device 101 can support up to two PCIe×2 buses 151 and 152 and two Ethernet ports 153 and 154 that are connected to a switch motherboard (not shown) over the mid plane 161 depending on a mode of operation. The two PCIe×2 buses 151 and 152 and the two Ethernet ports 153 and 154 are connected to a U.2 connector 121 of the NVMeoF device 101.

According to one embodiment, the NVMeoF device 101 can be configured to as an NVMe device. In the NVMe mode, a mode selector 160 can configure the NVMeoF device 101 to use all of the four lanes (in a single port mode) or only two lanes (in a dual port mode) of the four lanes of the PCIe bus to carry PCIe signals. The PCI×4 bus is connected to a midplane, and the PCIe bus is shared between data and control signals.

According to another embodiment, the NVMeoF device 101 can be configured as an NVMeoF device. In the NVMeoF mode, the mode selector 160 can configure the NVMeoF device 101 to use the two lanes of the PCIe×2 bus 151 to carry PCIe signals. The NVMeoF device 101 can further configure the remaining two lanes of the PCIe bus to carry Ethernet signals over the two Ethernet ports 153 and 154. In the NVMeoF mode, the two PCIe×2 lanes are directly transported to the PCIe×4 module 111, and signals over the remaining two PCIe×2 lanes are carried over the Ethernet ports 153 and 154 and buffered in the buffer 122 to be transported to the Ethernet NIC 112 of the NVMeoF device 101. The operational mode of the NVMeoF device 101 can be self-configured or externally set. For example, the NVMeoF device 101 can self-configure its operational mode using a physical pin (e.g., a presence pin on the chassis of the switch motherboard) or by an in-band command from a BMC (e.g., BMC 201 of FIG. 2) of the switch motherboard. The manageability information retrieved through Ethernet is referred to as "in-band" information whereas the manageability information retrieved through the PCIe bus is referred to as "out-of-band" information.

The NVMeoF device 101 can push various signals and perform various services over the PCIe ports 151 and 152 using the unused PCI×2 bus over the U.2 connector. Examples of the signals that can be pushed include, but are not limited to, health status information, field-replaceable unit (FRU) information, and sensor information of the NVMEOF device 101. Examples of the services that can be pushed over the PCIe ports include, but are not limited to, discovery services to a BMC or a CPU that is local to the switchboard and download services for a new NVMeoF device firmware for performing a firmware upgrade.

The NVMeoF device 101 can push some device-specific information directly to a BMC of the switch motherboard over the PCI×2 bus 151 over a control plane established between the switch motherboard and the NVMeoF device 101. Examples of such device-specific information that can be carried over the control plane include, but are not limited to, discovery information and FRU information of the NVMEOF device 101. This can reduce the burden of the BMC for polling the status of the NVMeoF device 101. The device-specific information may be communicated between the NVMeoF device 101 and the BMC using a new device command. The NVMeoF device 101 can support high availability (HA) multipath I/O with only the two PCIe lanes 151 and 152 of the PCIe×2 bus.

Figure 2:
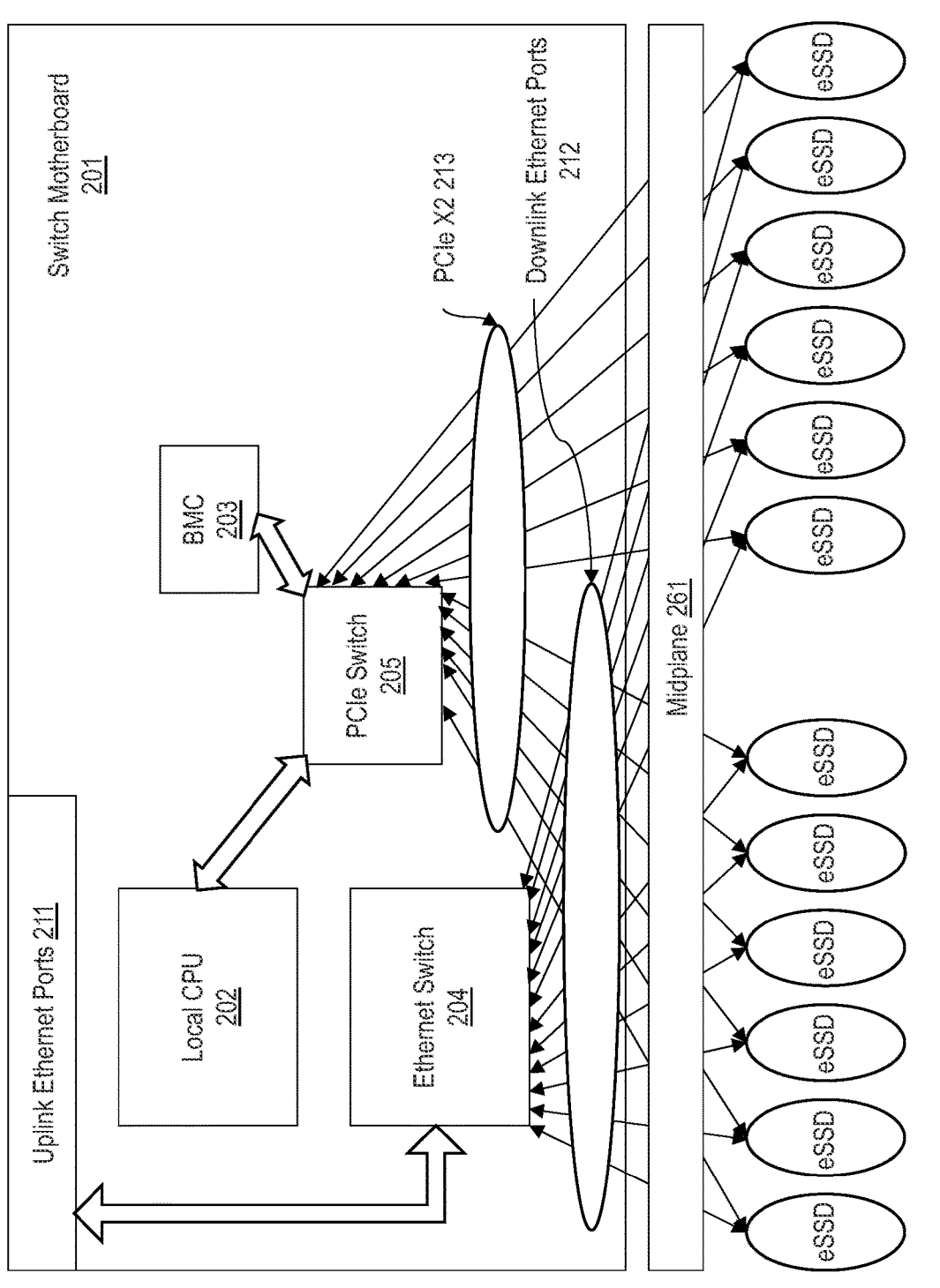
FIG. 2 illustrates a block diagram of an example switch motherboard, according to one embodiment.

FIG. 2 illustrates a block diagram of an example switch motherboard, according to one embodiment. The switch motherboard 201 has an uplink Ethernet ports 211, downlink Ethernet ports 212, a local CPU 202, a BMC 203, an Ethernet switch 204, and a PCIe switch 205. A number of eSSDs can be connected to the switch motherboard 201. According to one embodiment, the eSSD is an NVMeoF device that can be configured to work as an NVMe device or an NVMeoF device depending on the mode of operation. Each of the eSSDs can be connected to the switch motherboard 201 via a U.2 connector as shown in FIG. 1 and configured to connect to the switch motherboard 201 via several high-speed Molex connectors that collectively carrying all PCIe×2 bus 213 and the downlink Ethernet ports 212 and other non-high speed control signals such as SMBus, reset, clock, etc. The switch motherboard 201 can push various signals to each of the eSSDs and perform various services on each of the eSSDs over the PCIe×2 bus 213 and/or the downlink Ethernet ports 212 over the midplane 261. For example, the switch motherboard 201 can receive device-specific information from each of the eSSDs over the Ethernet ports 212, including, but not limited to, health status information, field-replaceable unit (FRU) information, and sensor information of the eSSD. The switch motherboard 201 can also perform various services over the Ethernet ports 212 including, but not limited to, discovery services to a BMC or a local host CPU and download services for a new eSSD firmware for performing a firmware upgrade.

Figure 3:
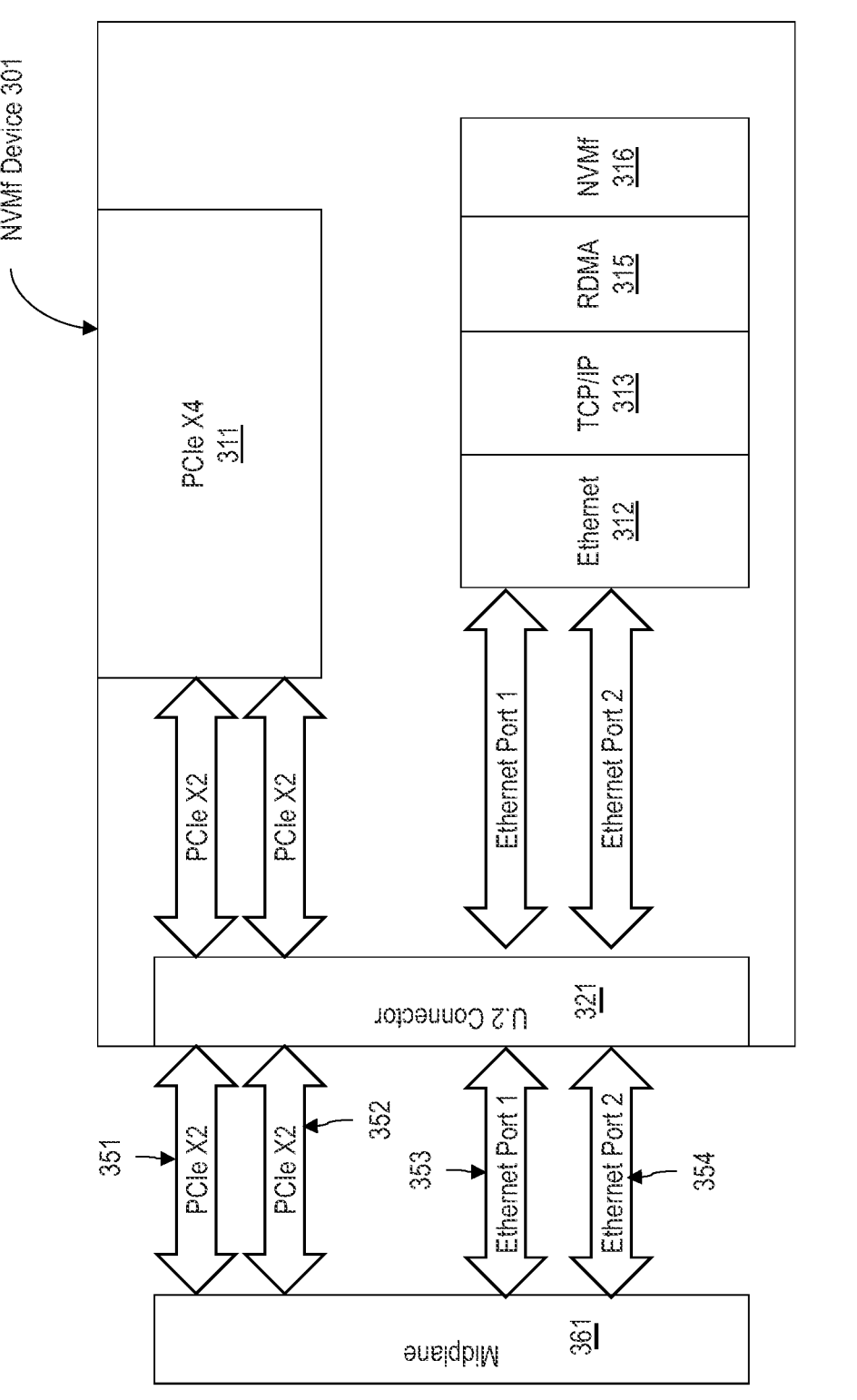
FIG. 3 illustrates a block diagram of an example NVMeoF device, according to another embodiment.

FIG. 3 illustrates a block diagram of an example NVMeoF device, according to another embodiment. The NVMeoF device 301 includes a PCIe×4 module 311 (e.g., PCIe×4 Gen3 module) and various hardware and protocol stacks including, but not limited to, an Ethernet network interface card (NIC) 312, and a TCP/IP offload engine 313, an RDMA controller 315, an NVMeoF protocol stack 316. The NVMeoF device 301 can support two PCIe×2 buses 351 and 352 and two Ethernet ports 353 and 354 that are connected to a switch motherboard (not shown) over the mid plane 361. The PCIe×2 buses 351 and 352 and the two Ethernet ports 353 and 354 are connected to a U.2 connector 321 of the NVMeoF device 301.

According to one embodiment, the NVMeoF device 301 can use the unused SAS pins of the U.2 connector 321 for Ethernet signals instead of using the PCIe lanes 153 and 154 as shown in FIG. 1. Because the NVMeoF device 301 uses the SAS pins for the Ethernet ports 353 and 354, the NVMeoF device 301 can support multi-path I/Os and multiple protocols without suffering from a bandwidth issue.

Figure 4:
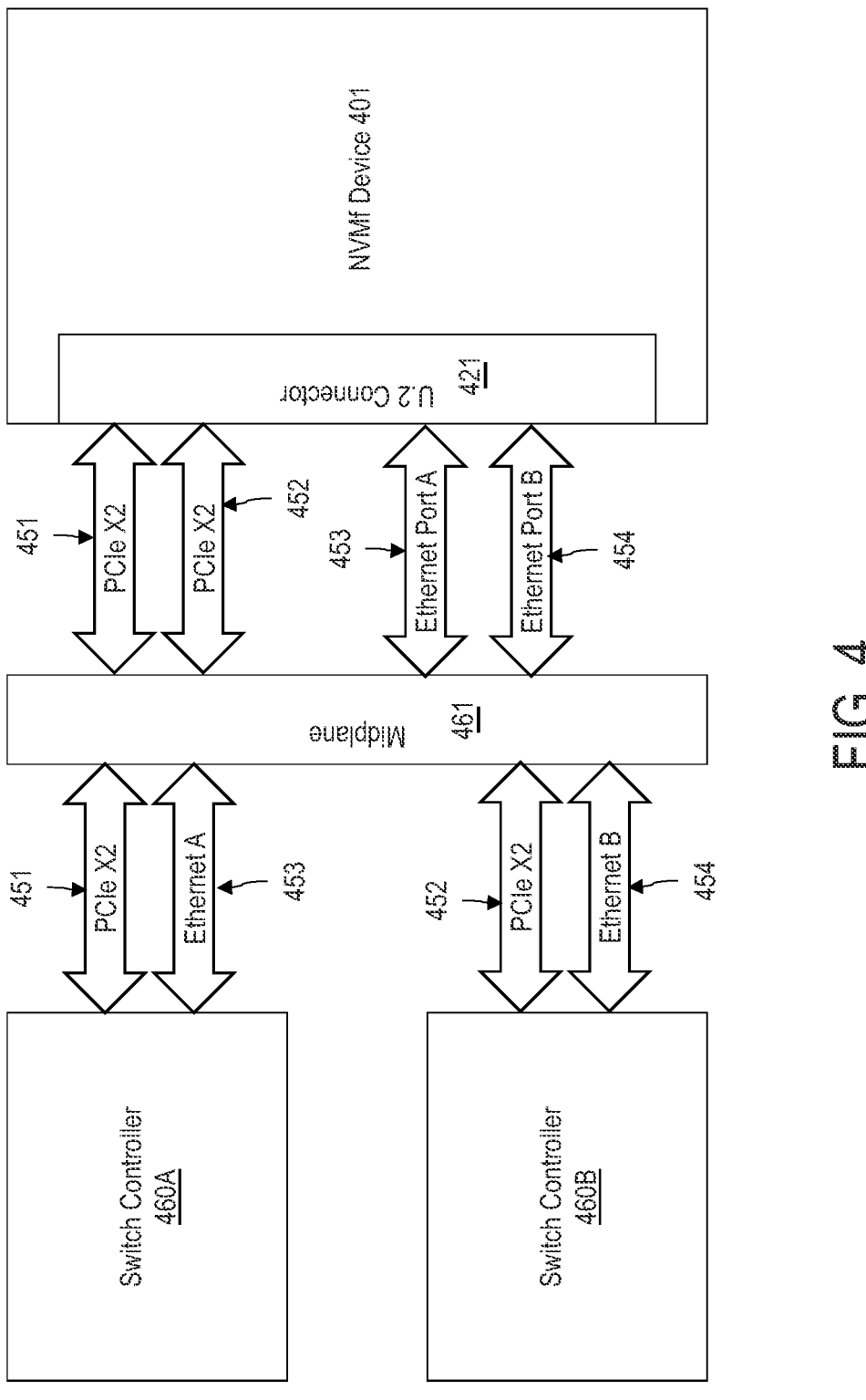
FIG. 4 illustrates a block diagram of an example NVMeoF device configured as an NVMe device operating in a HA mode, according to one embodiment.

FIG. 4 illustrates a block diagram of an example NVMeoF device configured as an NVMe device operating in a HA mode, according to one embodiment. In this example, the NVMeoF device 401 is configured as an NVMe device and can support multi-path I/Os using a U.2 connector 421. A two half-width switch includes two switch controllers 460A and 460B is contained in one 2 U chassis. The NVMeoF device 401 is connected to both the switch controllers 460A and 460B via the U.2 connector over the midplane 461. The switch controller 460A can support two lanes of the PCIe bus and an Ethernet port A while the switch controller 460B can support the remaining two lanes of the PCIe bus and an Ethernet port B. The NVMeoF device 401 can connect to the switch controller 460A over the two-lane PCIe bus 451 and the Ethernet port A 453. In addition, the NVMeoF device 401 can connect to the switch controller 460B over the two-lane PCIe bus 452 and the Ethernet port B 454.

Figure 5:
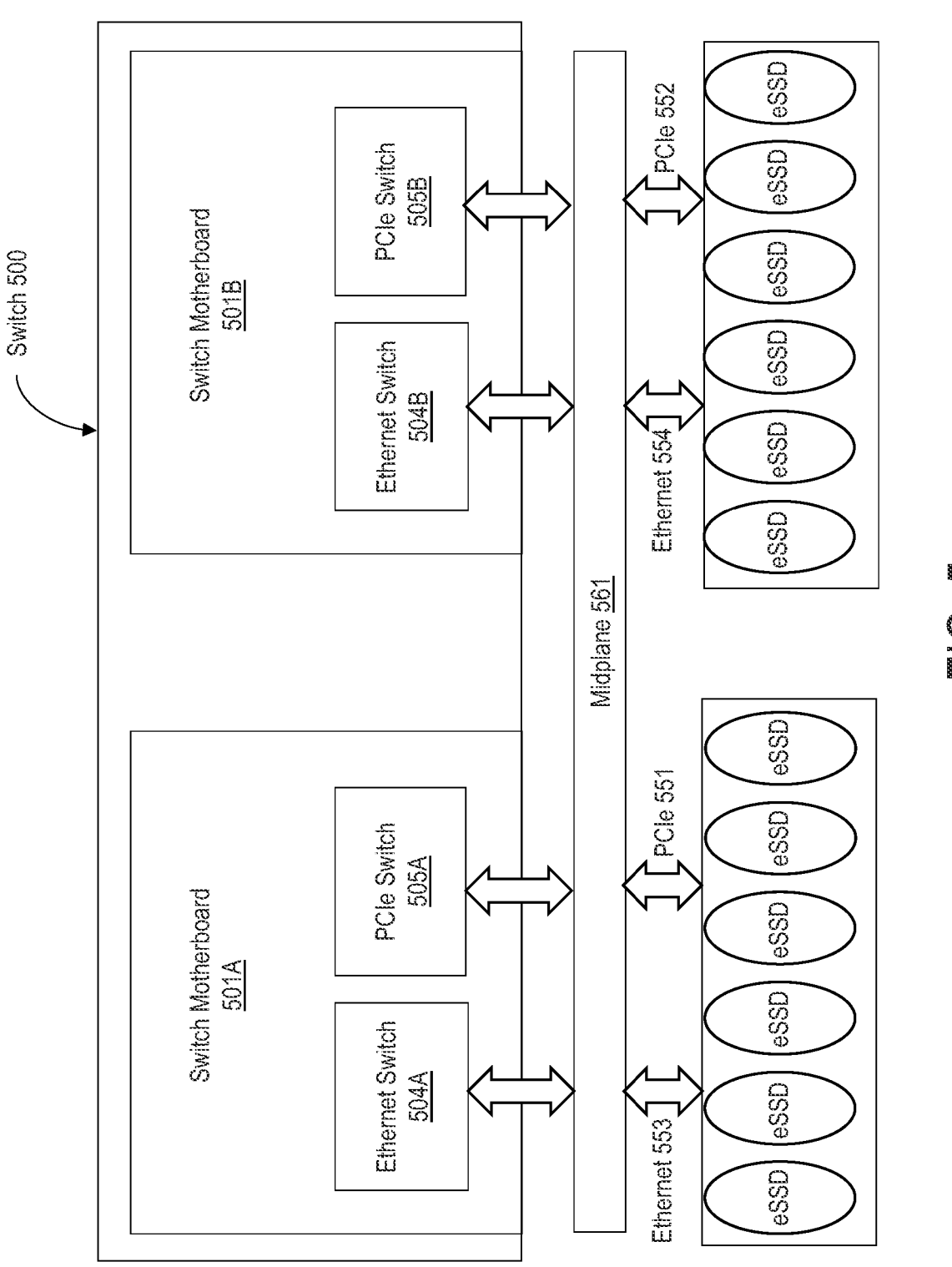
FIG. 5 illustrates a block diagram of an example switch including two switch motherboards, according to one embodiment.

FIG. 5 illustrates a block diagram of an example switch including two switch motherboards, according to one embodiment. The switch 500 includes two switch motherboards 501A and 501B to support multi I/O in a dual port configuration (in a HA mode). The switch motherboard 501A includes an Ethernet switch 504A and a PCIe switch 505A, and the switch motherboard 501B includes an Ethernet switch 504B and a PCIe switch 505B. Each of the switch motherboards 501A and 501B can include other components and modules, for example, a local CPU, a BMC, uplink Ethernet ports, downlink Ethernet ports, etc. as shown in the example switch motherboard 201 shown in FIG. 2.

Several eSSDs can be plugged into device ports of the switch. For example, each of the eSSDs is connected to the switch using a U.2 connector. Each eSSD can connect to both the switch motherboard 501A and the switch motherboard 501B. In the present example, the eSSDs plugged into the switch 500 are configured as an NVMeoF device requiring connectivity to the switch 500 over the midplane 561 via the PCIe bus and Ethernet ports.

According to one embodiment, the Ethernet signals between the switch 500 and the eSSDs can use SAS pins S2, S3, S5, and S6 for the primary Ethernet port 553 to the switch motherboard 501A. The Ethernet signals can also use S9, S10, S12, and S13 for the secondary Ethernet port 554 to the switch motherboard 501B. E25 pin of each U.2 connector can be used to enable the dual port configuration. PCIe signals can be carried over to PCIe buses 551 and 552 between the respective switch motherboards 501A and 501B and each of the eSSDs. The eSSD can self-configure its operational mode using a physical pin (e.g., a presence pin on the chassis of the switch) or by an in-band command from a BMC of the switch motherboard.

According to one embodiment, the switch 500 can support 10G Ethernet, and the midplane 561 is a common midplane that can support both a HA mode and a non-HA mode. Depending on the system configuration, signal integrity may need to be tested to ensure that the common midplane 561 can support for both configurations. If the signal integrity is not sufficient, the system can have two midplanes including the first midplane for the HA mode and the second midplane for the non-HA mode.

According to one embodiment, a system includes a fabric switch including a motherboard, a baseboard management controller (BMC), a network switch configured to transport network signals, and a PCIe switch configured to transport PCIe signals; a midplane; and a plurality of device ports. Each of the plurality of device ports is configured to connect a storage device to the motherboard of the fabric switch over the midplane and carry the network signals and the PCIe signals over the midplane. The storage device is configurable in multiple modes based on a protocol established over a fabric connection between the system and the storage device.

The storage device may have a U.2 connector.

The storage device may support both NVMe and NVMeoF protocols.

The midplane may support both a high availability (HA) mode and a non-HA mode.

The network signals may be carried over unused pins of the connector.

The network signals may provide discovery services or download services for a new firmware of the storage device.

The network signals may include device-specific information including one or more of health status information, field-replaceable unit (FRU) information, and sensor information of the storage device, and the device-specific information may be transported to the BMC over the midplane via PCIe lanes.

The storage device may be configured to operate in a HA mode or a non-HA mode.

According to another embodiment, an NVMeoF includes: a PCIe module; a network engine; and a connector configured to connect to a switch motherboard over a midplane and carry PCIe signals over the midplane. The PCIe module transports PCIe signals to the switch over the PCIe bus, and the network engine transport network signals to the switch over Serial Attached SCSI (SAS) pins of the connector.

The connector may be a U.2 connector.

The network signals may include device-specific information including one or more of health status information, FRU information, and sensor information of the NVMeoF device.

The device-specific information may be carried to a BMC of the switch over the midplane.

The network signals may provide discovery services or download services for a new firmware of the NVMeoF device.

The switch may include two switch boards including a primary Ethernet port and a secondary Ethernet port.

SAS pins S2, S3, S5, and S6 may be used for the primary Ethernet port, and SAS pins S9, S10, S12, and S13 may be used for the secondary Ethernet port.

The NVMeoF device may be configured to operate in a HA mode or a non-HA mode.

According to yet another embodiment, a system includes: a switch and a plurality of NVMeoF devices. Each NVMeoF device is configured to be coupled to the switch using a connector. The connector is configured to transport the PCIe signals to the switch over a PCIe bus and transport network signals to the switch over a network bus.

The connector may be a U.2 connector.

The PCIe signals may be transported over two PCIe lanes of the PCIe bus, and the network signals may be transported over the remaining two PCIe lanes of the PCIe bus.

The network signals may be transported over SAS pins.

The network signals may include device-specific information including one or more of health status information, FRU information, and sensor information of each NVMeoF device.

The network signals may provide discovery services or download services for a new firmware of each NVMeoF device.

Each NVMeoF device of the NVMeoF devices may be configured to operate in a HA mode or a non-HA mode.

The above example embodiments have been described hereinabove to illustrate various embodiments of implementing a system and method for supporting multi-path and/or multi-mode NVMeoF devices. Various modifications and departures from the disclosed example embodiments will occur to those having ordinary skill in the art. The subject matter that is intended to be within the scope of the invention is set forth in the following claims.

What is claimed is:

1. A device comprising:
   a component configured to receive instructions using an interconnect signal;
   a multi-protocol connector configured to carry the interconnect signal, wherein the multi protocol connector comprises a pin configured to carry a storage protocol physical signal; and
   an Ethernet interface configured to transport an Ethernet physical signal using the pin of the multi-protocol connector;
   wherein the device is configured to use a first protocol using the interconnect signal in a first mode; and
   wherein the device is configured to use a second protocol using the Ethernet physical signal in a second mode, wherein the second protocol is for accessing nonvolatile memory.

2. The device of claim 1 wherein the multi-protocol connector comprises a U.2 connector.

3. The device of claim 1 wherein the pin of the multi-protocol connector comprises a Serial Attached SCSI (SAS) pin.

4. The device of claim 3, wherein the Ethernet physical signal provides at least one of a discovery service or a download service.

5. The device of claim 1, wherein the device is a first device, the Ethernet interface is a first network interface, the first device is configured to receive the interconnect signal from a second device, and the second device comprises a second network interface that uses the pin of the multi-protocol connector.

6. The device of claim 1, wherein the storage protocol comprises a SAS protocol.

7. The device of claim 1, wherein the device provides device information using the interconnect signal.

8. A device comprising:
   a component configured to receive instructions using an interconnect signal;
   a multi-protocol connector configured to carry the interconnect signal, wherein the multi-protocol connector comprises a pin configured to carry a storage protocol physical signal; and an Ethernet interface configured to transport an Ethernet physical signal using the pin of the multi-protocol connector;

wherein the device is configured to use a first protocol using the interconnect signal in a first mode;

wherein the device is configurable in a second mode based on a second protocol, wherein the second protocol is for accessing nonvolatile memory.

9. The device of claim 8, wherein the pin is a first pin, the Ethernet physical signal is a first network signal, and the multi-protocol connector comprises a second pin, the device further comprising:

a first network port connected to the first pin to communicate using the first network signal; and a second network port connected to the second pin to communicate using a second network signal.

10. A system comprising:

a first device comprising a controller; and a second device comprising:

a component configured to receive instructions from the first device using an interconnect signal;

a multi-protocol connector configured to carry the interconnect signal, wherein the multi-protocol connector comprises a pin configured to carry a storage protocol physical signal; and an Ethernet interface configured to transport an Ethernet physical signal to the first device using the pin of the multi-protocol connector;

wherein the second device is configured to use a first protocol using the interconnect signal in a first mode; and wherein the second device is configured to use a second protocol using the Ethernet physical signal in a second mode, wherein the second protocol is for accessing nonvolatile memory.

11. The system of claim 10, wherein the second device provides device information using the interconnect signal.

12. The system of claim 10 further comprising a switch board, wherein multi-protocol connector is configured to connect the second device to the switch board.

13. The system of claim 10, wherein the pin of the multi-protocol connector comprises a Serial Attached SCSI (SAS) pin.

14. The system of claim 10, wherein the Ethernet physical signal provides at least one of a discovery service or a download service.

15. The system of claim 10, wherein the first device comprises a network port that uses the pin of the multi-protocol connector.

16. The system of claim 10, wherein the controller comprises a baseboard management controller (BMC).

17. The system of claim 10, wherein the second device is configurable in the first mode based on a protocol established with the system using a fabric connection.

18. The system of claim 10, wherein the pin is a first pin, the Ethernet physical signal is a first network signal, and the multi-protocol connector comprises a second pin, the second device further comprising:

a first network port connected to the first pin to communicate using the first network signal; and a second network port connected to the second pin to communicate using a second network signal.

19. The system of claim 10, wherein the storage protocol comprises a SAS protocol.

* * * * *